Oct. 6, 1959 O. J. MAHA 2,907,596
SEALING APPARATUS
Filed June 22, 1954
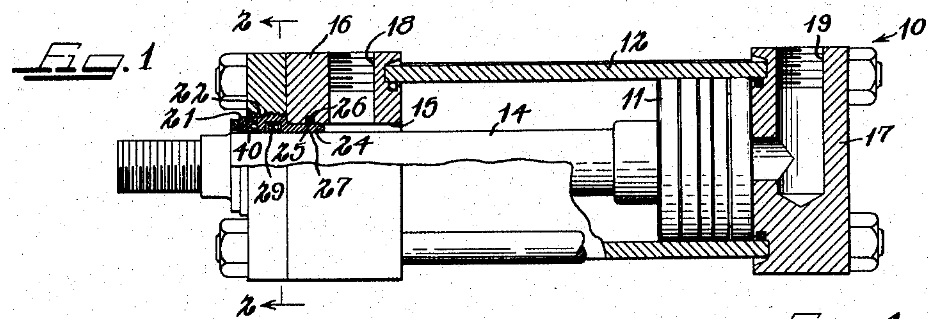
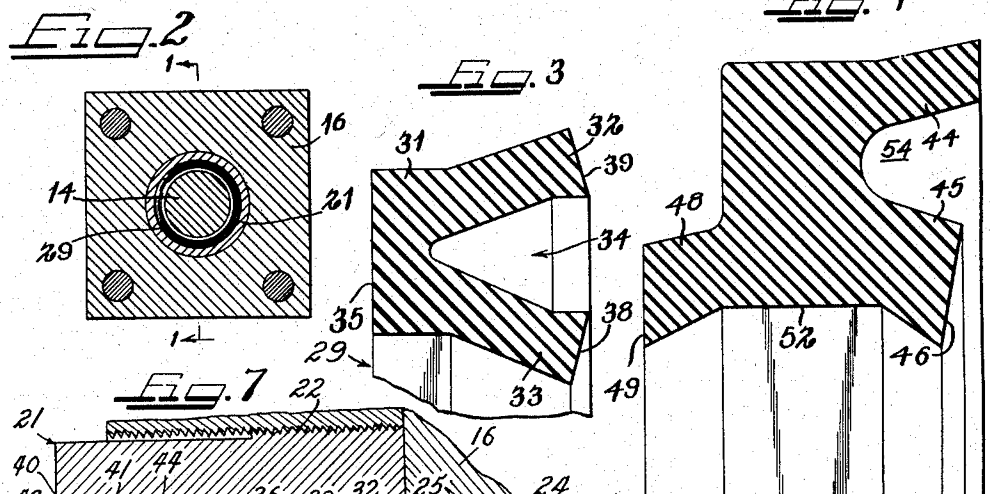
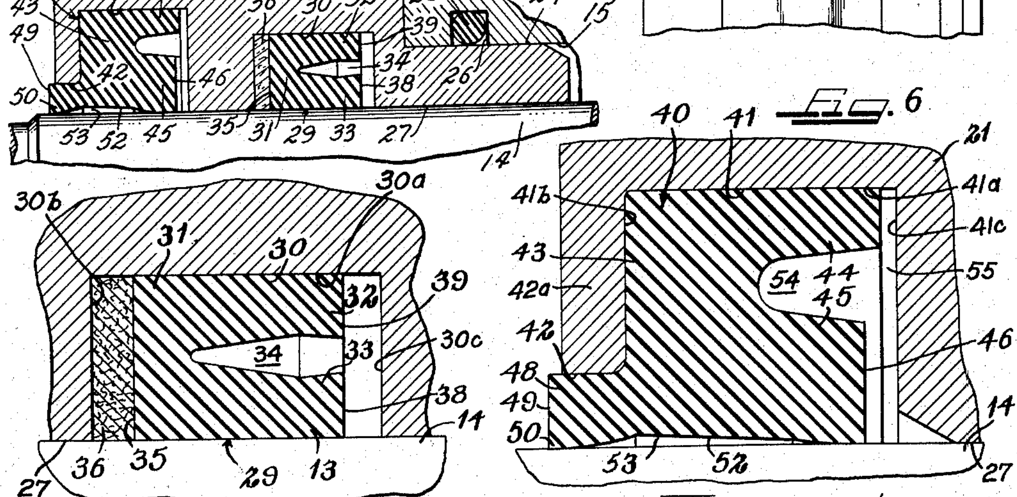
Fig. 5
Inventor
OTTO J. MAHA
Ooms, Mc Dougall, Williams + Hersh
Attys.

United States Patent Office 2,907,596

Patented Oct. 6, 1959

2,907,596

SEALING APPARATUS

Otto J. Maha, Chicago, Ill., assignor to Parker-Hannifin Corporation, a corporation of Ohio Application June 22, 1954, Serial No. 438,381

5 Claims. (Cl. 286—26)

One principal object of the invention is to provide an improved packing gland including sealing rings of a novel, advantageous construction for sealing a piston rod or the like against the escape of any fluid while at the same time wiping virtually all traces of the fluid from the rod and preventing entry of foreign material into the gland.

A further object of the invention is to provide an improved sealing ring which is arranged to compensate for distortion under load and thereby to provide a more effective seal.

Another object is to provide an improved wiping ring adapted to wipe virtually all traces of oil or other fluid from a piston rod or the like during outward movement of the rod and to wipe foreign material from the rod when it moves inwardly.

It is a further object of the invention to provide an improved sealing arrangement utilizing inner and outer sealing rings seated in a packing gland so that the inner ring will be adapted to seal a piston rod or the like against the escape of oil or other fluid, while the outer ring is adapted to wipe oil and foreign material from the rod, the inner ring being arranged to vent oil from the space between the rings.

Further objects and advantages of the invention will appear from the following description, taken with the accompanying drawing, in which:

Figure 1 is an elevational view of a hydraulic cylinder incorporating a sealing arrangement constructed in accordance with the invention, the view being partly in section along a line 1—1 in Fig. 2;

Fig. 2 is a transverse sectional view taken generally along a line 2—2 in Fig. 1;

Figs. 3 and 4 are enlarged cross-sectional views of a sealing ring and a wiper ring embodied in the sealing arrangement of Fig. 1; and Figs. 5 and 6 are enlarged cross-sectional views showing the sealing ring and the wiper ring in position of use and under fluid pressure.

Fig. 7 is a fragmentary enlarged sectional view, taken longitudinally through the cylinder, to illustrate the sealing arrangement with greater clarity.

The purely illustrative embodiment of the invention shown in Fig. 1 comprises a hydraulic cylinder 10 including a piston 11 movable in a cylindrical casing 12. A cylindrical rod 14, secured to the piston 11, extends through an axial bore 15 formed in an end cap 16 which closes one end of the casing 12. The other end of the casing is closed by an end cap 17. Threaded openings 18 and 19 are formed in the end caps 16 and 17 to admit oil or some other actuating fluid to the casing 12 on opposite sides of the piston 11. While the invention will be illustrated in connection with a hydraulic cylinder, it will be understood that the invention is equally applicable to an air cylinder or any other device where it is desired to form a seal between inner and outer relatively translatable or rotatable cylindrical members.

In the illustrated hydraulic cylinder 10, a seal is formed between the piston rod 14 and the end cap 16 by means of a packing gland 21 having a threaded portion 22 adapted to be screwed into the end cap 16, for easy removal or replacement of the gland. In this way it is a simple matter to service the packing gland 21. The gland 21 has a reduced inner end portion 24 received in the bore 15. An O-ring 25 is engaged with the reduced portion 24 of the gland and is seated in a groove 26 in the end cap 16, in order to prevent leakage of the hydraulic oil between the gland 21 and the end cap 16.

An axial bore 27 is formed in the gland 21 to provide a cylindrical bearing surface for the piston rod 14. The gland 21 may be made of bronze or some other good bearing material, and the rod 14 may be hardened or plated and highly polished to minimize friction.

To prevent leakage of oil between the rod 14 and the gland 21, a pressure sensitive sealing ring 29 of generally U-shaped cross section is disposed in an internal annular groove 30 formed in the gland. In this instance, the groove 30 has a generally rectangular cross section. Thus, the groove 30 has a cylindrical bottom wall **30*a* and flat end walls 30*b* and 30*c* perpendicular thereto. The illustrated ring 29 comprises an annular body portion 31 having a generally rectangular cross section. Radially spaced sealing lips 32 and 33 extend from one end of the body portion 31 in the axial direction from which pressure is applied to the sealing ring 29. It will be seen that the lip 32 is outside the lip 33 and is adapted to be pressed outwardly into the groove 30 by the hydraulic pressure developed in the casing 12. The inner lip 33 is adapted to be pressed against the outer surface of the piston rod 14. An open generally V-shaped annular groove 34 is formed between the lips 32 and 33** to admit the hydraulic fluid between the lips.

On the end of the ring 29 opposite from the lips 32 and 33, the annular body portion is formed with a radial end surface 35. A disk-shaped back-up washer 36 is interposed between this flat end surface 35 and the flat end wall **30*b* of the groove 30 to prevent extrusion of the sealing ring 29 into the clearance space between the piston rod 14 and the gland 21. The ring 29 is most advantageously made of synthetic rubber or other rubber-like material which will extrude relatively easily. The back-up washer 36, on the other hand, is most advantageously made of leather or some other material, such as impregnated cork, which will not extrude easily but will deform slightly to fill up the clearance space between the rod and the gland. Accordingly, the back-up washer 36 prevents the sealing ring from extruding and being pinched off between the rod 14 and the gland 21. As shown in Fig. 5, the axial length of the groove 30 is substantially greater than the combined axial lengths of the rings 29 and 36**.

When the sealing ring 29 is in a free state, as shown in Fig. 3, the sealing lips 32 and 33 diverge from each other. The inner lip 33 extends to a slightly smaller diameter than the diameter of the rod 14, while the outer lip 32 extends to a somewhat larger diameter than that of the bottom wall **30*a* of the groove 30. With the ring 29 in its position of use, the lips 32 and 33 are compressed into the space between the groove 30 and the rod 14. The inner lip 33 exerts an initial sealing pressure on the rod 14, while the outer lip 32 exerts an initial sealing pressure on the outer wall 30*a* of the groove 30. Moreover, the sealing ring 29 is distorted by the hydraulic pressure developed in the casing 12**.

In order that the ring 29 may be most effective as a seal, the inner lip 33 is formed with a frusto-conical or tapered end surface 38 which faces generally in an axial direction, but actually flares or angles outwardly and axially when the ring 29 is in a free state. In other words, the end surface 38 is internally tapered and generally frusto-conical when the ring 29 is removed from the groove 30. The inclination of the end surface 38 is made such that the surface shifts into a radial plane when the ring 29 is in its position of use and is subjected to hydraulic pressure, as shown in Fig. 5. Under these conditions, the surface 38 is perpendicular to the cylindrical outer surface of the rod. It has been found that this perpendicular relation provides the best possible wiping action between the inner lip 33 and the rod 14.

The angle of inclination of the end surface 38 may be chosen in accordance with the dimensions of the sealing ring 29 and the groove 30 and the conditions of pressure under which the sealing ring is employed. It has been found that an angle of 20 degrees is suitable in many instances, the angle being measured between the end surface 38 and a plane perpendicular to the axis of the ring, with the ring in a free state. Under various conditions, however, it may be advantageous to vary the angle in the range between five and 30 degrees.

In this instance, the outer lip 32 is also formed with an end face 39 which is tapered or inclined when the sealing ring 29 is in a free state (Fig. 3). The end face 39 is shifted into a generally radial plane when the ring 29 is in position of use between the gland 21 and the rod 14 and is subjected to fluid pressure (Fig. 5).

While the improved sealing ring 29 provides a more effective seal than any other known means, it leaves a very thin film of oil on the rod 14. In order to wipe this thin film of oil off the rod so that the portion of the rod extending outside the end cap 16 will be virtually dry, a second sealing or wiping ring 40 is disposed in a second groove 41 formed in the gland 21. The illustrated groove 41 is generally rectangular in cross section. Thus, the groove 41 has a cylindrical outer wall **41*a* and flat end walls 41*b* and 41*c* perpendicular thereto. An enlarged bore 42 is formed in the extreme outer end of the gland 21 to define an annular slot or opening communicating with the groove 41. The formation of the groove 41 and the bore 42 provides an annular inwardly directed flange 42*a* on the end of the gland 21**.

Like the sealing ring 29, the wiping ring 40 is formed with a body portion 43 of generally rectangular cross section. Outer and inner sealing lips 44 and 45 extend from one end of the body portion 43 in the direction from which pressure is applied to the ring 40. The lips 44 and 45 are similar to the corresponding lips on the ring 29, except that the lips 44 and 45 are somewhat thicker. Moreover, as shown in Fig. 6, the inner lip 45 is substantially thicker than the outer lip 44, the thickness of the inner lip 45 being approximately half the total radial thickness of the wiper ring 40, when positioned in the groove 41. Each of the lips 44 and 45 is of nearly uniform thickness throughout its length. When the ring 40 is in its free state, the lips 44 and 45 diverge somewhat. The inner lip 45 extends to a somewhat smaller diameter than that of the rod 14, while the outer lip 44 extends to a somewhat larger diameter than that of the groove 41, so that the lips will exert an initial sealing pressure when the ring 40 is in its position of use, compressed within the groove 41. Like the inner lip 33 on the ring 29, the inner lip 45 is provided with an end surface 46 which angles outwardly and axially when the ring 40 is in a free state. The surface 46 thus forms a small angle with a plane perpendicular to the axis of the ring 40. This inclination of the surface 46 compensates for the distortion which occurs in the ring 40 due to the presence of the rod 14 and the action of hydraulic pressure when the ring is in its position of use. Due to this distortion, the surface 46 is shifted into a position at right angles to the outer surface of the rod 14 when the ring 40 is under load, as shown in Fig. 6. This perpendicular relation between the end surface 46 and the rod 14 has been found to provide the most effective wiping action. With this angled construction the inner lip 45 wipes off virtually all of the film of oil which is carried through the sealing ring 29 by the rod 14. It will be understood that the outer lip 44 is pressed outwardly against the gland 21 by the resiliency of the lip 44 and the action of hydraulic pressure. Thus, the lip 44 prevents the hydraulic fluid from leaking between the ring 40 and the gland 21. Because the inner lip 45 of the wiper ring 40 is substantially thicker than the inner lip 33 of the sealing ring 29, the lip 45 has a greater initial pressure against the rod 14, so that the lip 45 will provide an effective wiping action even though there is little or no fluid pressure against the lips 44 and 45. It will be seen from Fig. 6 that the inner lip 45 has a greater radial thickness than the radial width of the annular opening between the bore 42 and the rod 14. Thus, the end wall **41*b* on the flange 42*a* extends radially in an inward direction across the greater portion of the radial thickness of the wiping ring 40, and opposite a substantial portion of the thickness of the inner lip 45**.

The effective wiping action of the lip 45 leaves the exposed portion of the rod virtually dry so that it does not tend to collect foreign material. In order to wipe off any foreign material which may nevertheless come to rest on the rod 14, the wiping ring 40 is provided with an additional external wiping lip 48 which extends outwardly into the annular slot 42 formed in the gland 21.

For maximum strength, the lip 48 is made with a heavy cross section and is provided with an end surface 49 extending in a generally radial plane so as to be perpendicular to the outer surface of the rod 14. This perpendicular relation between the surface 49 of the rod 14 has been found to provide the most effective wiping action. Moreover, the perpendicular end surface 49 provides a blunt wiping edge 50 which has maximum strength and, hence, is adapted to resist damage due to impact or abrasion with foreign particles or objects. There will be a tendency for the wiping ring 40 to be extruded through the annular slot 42 by any high fluid pressure that may develop between the lips 44 and 45. However, the flange **42*a* backs up the major portion of the ring 40 in a rigid and unyielding manner. Moreover, by extending opposite a substantial portion of the transverse cross-section of the inner lip 45, the flange 42*a* supports the wiping ring 40 in such a manner that the axial outward displacement by fluid pressure of the radially inward portion of the lip 45 which is opposite the annular space between the rod 14 and the bore 42 is resisted by the shear strength of the entire combined axial length of the body portion 43 and the inner lip 45**.

Between the oppositely extending lips 45 and 48, the wiping ring 40 is formed with an outwardly relieved, internal, generally cylindrical surface 52 which affords a clearance space 53 between the ring 40 and the rod 14 when the ring is in position of use. This clearance reduces friction between the ring 40 and the rod 14. A generally U-shaped groove 54 is formed in the ring 40 between the lips 44 and 45. It will be noted from Fig. 6 that the groove 41 is axially longer than the wiping ring 40 to provide a hollow space 55, which, together with the groove 54, is adapted to receive and retain any oil which may pass the sealing ring 29. The space 55 is open only to the bore 27 in the gland 21, so that the space 55 will retain the fluid even though a high pressure develops in the fluid.

In operation, the sealing ring 29 is subjected to the hydraulic pressure in the casing 12, inasmuch as the hydraulic oil readily penetrates the clearance space between the piston rod 14 and the internal bearing surface 27 of the gland 21. It will be understood that the hydraulic fluid lubricates the rod 14 and the bearing 27. If air were used as the actuating fluid, a lubricant would be introduced into the bearing 27 and, hence, would be present on the rod 14. The hydraulic pressure forces the outer sealing lip 32 outwardly against the gland 21 and presses the inner lip 33 into firm sealing engagement with the rod 14. Although the end surface 38 of the ring 29 is angled when the ring is in a free state, the confining presence of the rod 14 and the action of the hydraulic pressure distort the ring 29 so that the surface 38 is perpendicular to the rod 14 when the ring is in position of use and under load. Thus, the angling of the surface 38 compensates for the distortion to which the ring 29 is subjected. The perpendicular relation between the surface 38 and the rod 14 assures an effective sealing action between the lip 33 and the rod. The backup ring or washer 36 supports the sealing ring 29 so that it will not extrude into the clearance space between the gland 21 and the rod 14. The backup ring 36 is supported by the end wall **30*b* of the groove 30. It will be seen from Fig. 5 that the end wall 30*b* is substantially at right angles to the axis of the rod 14, so that the fluid pressure on the ring 29 will not cause any wedging or funneling action which would tend to drive the backup ring 36 and the sealing ring 29 into the annular clearance space between the rod 14 and the bore 27 in the flange 21**.

The thin film of oil which is carried on the rod 14 through the sealing ring 29 is wiped off the rod by the inner lip 45 of the wiping ring 40. Like the ring 29, the ring 40 distorts under load so that its end surface 46 is shifted from an angled position to a position perpendicular to the rod.

On the return stroke of the rod 14, foreign material is wiped off the rod by the external lip 48. An effective wiping action is assured by the perpendicular relation between the end face 49 and the rod.

The oil wiped off the rod 14 by the ring 40 accumulates in the intersticial space between the rings 29 and 40. There would be a tendency for oil pressure to build up in the intersticial space between the rings were it not for the construction of the sealing ring 29, which is arranged so as to permit return of oil to the casing 12. When the pressure in the space between the rings 29 and 40 exceeds the pressure in the casing 12, the inner lip 33 of the ring 29 is forced outwardly away from the rod 14. This results in venting of the space between the rings 29 and 40. In the normal operation of the cylinder 10, the pressure in the portion of the casing 12 communicating with the bore 15 drops to zero, or at least to a small value, when the direction of movement of the piston 11 is reversed so as to move the rod 14 outwardly. At this point in the cycle of operation, the sealing ring 29 relieves any substantial pressure which may have built up in the space between the rings 29 and 40. This venting action occurs with a pressure differential of as little as 20 pounds per square inch. It will now be understood that the sealing ring 29 acts in the manner of a check valve to prevent outward leakage of oil while permitting return of oil to the casing 12.

Various modifications, alternative constructions, and equivalents may be employed without departing from the true spirit and scope of the invention disclosed in the drawing and the foregoing description and as defined in the following claims.

I claim:

1. A wiper ring for use between a piston rod or the like and a hollow gland or the like, comprising an annular body, inner and outer radially spaced divergent thick blunt sealing lips extending from one end of said body in one direction and adapted to be pressed against the rod and the gland, said body having an inside diameter corresponding to the diameter of the rod, said inner lip angling radially inwardly to an inside diameter substantially less than the diameter of the rod, said inner lip having an end surface which is frusto-conical when said ring is in a free state, said end surface constituting a portion of an internal cone and extending at a small angle with respect to the perpendicular to the axis of the ring, said inner lip being adapted to be stretched around the rod in position of use and thereby being deformable to shift said end surface substantially into a plane perpendicular to the axis of the ring, said inner lip constituting means for wiping liquid from said rod, and an additional thick blunt lip extending in the opposite direction from the opposite end of said body for wiping foreign material from said rod, said additional lip having a substantially flat end surface substantially in a plane perpendicular to the axis of the ring.

2. A wiping ring for use between a rod and a hollow gland, said ring comprising an annular body, inner and outer radially spaced thick blunt divergent sealing lips extending from one end of said body in one direction and adapted to be pressed against the rod and the gland, said inner lip constituting means for wiping liquid from said rod, said inner lip having an inner surface and an end surface with a generally square corner therebetween for effective wiping action, and an additional thick blunt lip extending in the opposite direction from the opposite end of said body for wiping foreign material from said rod, said additional lip having an end surface substantially in a radial plane perpendicular to the axis of said ring, said additional lip having an inner surface and a generally square corner between said inner surface and said end surface for effective wiping action.

3. Sealing apparatus for a fluid power cylinder or the like, comprising, in combination, a hollow gland having a bore therein, a rod slidably received in said bore, said gland having an annular groove formed in said bore around said rod, a soft resilient wiping ring received in said groove between said gland and said rod, said wiping ring comprising an annular body, inner and outer radially spaced thick blunt divergent sealing lips extending from one end of said body in one direction and pressed against said rod and said gland by the inherent resilience of said lips, said body having an inside diameter corresponding to the diameter of the rod, said inner lip angling inwardly to an inside diameter substantially less than the diameter of the rod when said ring is in a free state, said inner lip having an end surface which is frusto-conical when said ring is in a free state, said end surface constituting a portion of an internal cone and extending at a small angle with respect to the perpendicular to the axis of the ring, said inner lip being stretched around the rod in position of use and thereby being deformed to shift said end surface substantially into a plane perpendicular to the axis of the ring, said inner lip constituting means for wiping liquid from said rod, and an additional thick blunt lip extending in the opposite direction from the opposite end of said body for engaging the rod and wiping foreign material therefrom, said additional lip having a substantially flat end surface substantially in a plane perpendicular to the axis of the ring.

4. Sealing apparatus for a fluid power cylinder or the like, said apparatus comprising a gland having a bore therein, a rod slidably received in said bore, said gland having an internal annular groove formed in said bore around said rod, said groove being generally rectangular in cross section, said bore having an enlarged portion at one end thereof forming an annular slot between said gland and said rod and connecting with said groove, a soft resilient wiping ring seated in said groove and pressed between said gland and said rod, said ring having an annular body formed with inner and outer radially spaced thick blunt divergent sealing lips extending from one end of said body in one direction, said inner lip having an annular end surface which is tapered and constitutes a portion of an internal cone when said ring is in a free state, said end surface extending at a small acute angle to a plane perpendicular to the axis of said ring, said inner lip angling inwardly when said ring is in a free state to an inside diameter substantially less than the diameter of the rod, said body having an inside diameter corresponding to the diameter of the rod, said inner lip being stretched around said rod in position of use and thereby being deformed to shift said end surface substantially into a plane perpendicular to the axis of the ring, said inner lip having an inner surface with a substantially square corner between said inner surface and said end surface for effective wiping action, and an additional annular thick blunt lip extending in the opposite direction from the opposite end of said body into said annular slot for wiping foreign material from the rod, said additional lip having an end surface and an inner surface with a substantially square corner therebetween, said end surface on said additional lip extending generally in a plane perpendicular to the axis of the ring.

5. Sealing apparatus as defined in claim 4, wherein the small angle between said end surface on said inner lip and a plane perpendicular to the axis of said lip is in the range from five to thirty degrees.

References Cited in the file of this patent

UNITED STATES PATENTS

| | | |
|---|---|---|
| 2,509,436 | Isenbarger | May 30, 1950 |
| 2,565,923 | Hrdlicka | Aug. 28, 1951 |
| 2,639,198 | Kirkham | May 19, 1953 |
| 2,656,820 | Becker | Oct. 27, 1953 |
| 2,660,493 | Flick | Nov. 24, 1953 |
| 2,701,155 | Estel | Feb. 1, 1955 |